United States Patent Office 2,970,157
Patented Jan. 31, 1961

2,970,157

PREPARATION OF 16-ALKYL-20-KETO STEROID ENOL ACYLATES

Frank A. Cutler, Jr., Westfield, N.J., James A. Hause, Turbotville, Pa., and Meyer Sletzinger, North Plainfield, N.J., assignors to Merck & Co., Inc., Rahway, N.J., a corporation of New Jersey No Drawing. Filed Sept. 8, 1958, Ser. No. 759,425

15 Claims. (Cl. 260—397.45)

This invention relates to the preparation of steroid enol acylates. More particularly, it is concerned with an improved method of preparing 16-alkyl-20-keto steroid enol acylates by the acylation of the corresponding metallic enolates.

It has recently been found that 16α-alkyl steroids such as 16α-methyl-9α-fluoro-prednisolone, 16α-methyl prednisolone, and 16α-methyl prednisone possess greater anti-inflammatory activities than other steroids such as cortisone, hydrocortisone, prednisone, and prednisolone, and in addition have very desirable non-salt retaining properties.

One problem encountered in the preparation of such 16α-methyl steroids has been the introduction of the 17α-hydroxy substituent in steroid compounds having a 16α-methyl substituent. The presence of the substituent at the 16th position hinders and makes it difficult to introduce the 17α-hydroxy group via the enol acylates. Thus, for example, in acylating 16α-methyl-3α-hydroxypregnane-11,20-dione, it is necessary to carry out the acylation by reaction with acylating agents in the presence of strong acid catalysts in order to obtain the desired enol acetate. Under these conditions the yield of the enol acylate is low, and undesirable by-products are produced which are difficult to separate from the desired enol acylate. Accordingly, other methods of preparing these enol acylates which would avoid these difficulties have been sought.

In accordance with the present invention this desideratum is achieved by the direct acylation of metallic enolates of 16-alkyl-20-keto steroids.

It is therefore an object of the present invention to provide an improved method of preparing the enol acylates of 16α-alkyl-20-keto steroids. Other objects will be apparent from the detailed description of this invention hereinafter provided.

In accordance with the present invention, it is now found that the enol acylates of 16α-alkyl-20-keto steroids can be readily and conveniently prepared by the acylation of the metallic enolate produced by the reaction of an alkyl organo metal compound with a Δ$^{16}$-20-keto steroid. This reaction sequence can be shown as follows:

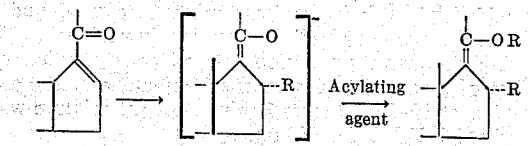

wherein R represents an alkyl group.

The acylation is conveniently effected by intimately contacting the metallic enolate produced by the reaction of an alkyl organo metallic compound with a Δ$^{16}$-20-keto steroid. The metallic enolates are obtained by reacting Δ$^{16}$-20-keto steroids with suitable organo metallic alkylating agents such as alkyl magnesium halide, a dialkyl cadmium, or a dialkyl zinc. The intermediate metallic enolates obtained by this reaction can then be immediately reacted with the acylating agent without isolation of the compound from the medium in which it is obtained. Various acylating agents can be utilized for this purpose, although it is found most convenient to employ a lower alkanoyl acylating agent for this purpose. Acylating agents suitable for this purpose that might be mentioned are acyl halides such as acetyl chloride, propionic chloride, butyryl chloride, and the like, or acid anhydride such as acetic anhydride, propionic anhydride, butyric acid anhydride, and the like.

Generally, however, it is preferred to use an acetic acid acylating agent since such reactants are inexpensive and readily available.

The acylation is readily effected by intimately contacting the reaction mixture containing the metallic enolate with the acylating agent for sufficient time to complete the formation of the desired enol acylate. Thus, the acylation can be effected at room temperature or at slightly elevated temperatures and is complete within about one to two hours.

This improved method of preparing enol acylates of 16α-alkyl-20-keto steroids is, as indicated above, particularly useful in the preparation of 16α-alkyl-20-keto compounds of the pregnane or allopregnane series. These 16α-alkyl-20-keto pregnanes and allopregnanes may have other unsaturated linkages and or other substituents such as hydroxy, acyloxy, halogen, alkyl groups and the like in rings A, B, and C. Examples of suitable starting materials which can be alkylated to form the corresponding 16α-alkyl substituted compounds, and these in turn acylated to obtain the desired enol acylates that might be mentioned are 3-acyloxy-16-pregnene-11,20-dione, 3-acyloxy-16-allopregnene-11,20-dione, 3-acyloxy-9(11), 16-pregnadien-20-one, 3-acyloxy-9(11), 16-allopregnadien-20-one, 3-acyloxy-16-pregnen-20-one, 3-acyloxy-16-allopregnen-20-one, 3-acyloxy-11β-hydroxy-16-pregnen-20-one, 3-acyloxy-11β-hydroxy-16-allopregnen-20-one, 2-alkyl-3-acyloxy-16-allopregnen-20-one, 3-acyloxy-6-alkyl-16-pregnen-11,20-dione, 16-pregnene-3,11,20-trione, 16-allopregnene-3,11,20-trione, 3,21-diacyloxy-16-pregnene-11,20-dione, 3,21 - diacyloxy - 16 - allopregnene-11,20-dione, 3,21-diacyloxy-9(11),16-pregnadien-20-one, 3,21-diacyloxy-9(11),16 - allopregnadien - 20-one, 3-acyloxy-5,16-pregnadien-20-one, 3-acyloxy-5,6-dihalo-16-pregnen-20-one, and the like.

The following examples are illustrative of methods of carrying out the present invention.

EXAMPLE 1

*Preparation of 16α-methyl-3α,20-diacetoxy-17(20)-pregnen-11-one by acetylation of the reaction product of 3α-acetoxy-16-pregnen-11,20-dione and methyl magnesium iodide*

To the solution containing the metallic enolate obtained by intimately contacting 3α-acetoxy-16-pregnen-11,20-dione with methyl magnesium iodide in ethyl ether, as described below, was added 31.4 g. of acetyl chloride.

The reaction mixture was then stirred for one hour at 25–30° C. and then cooled to 0° C. In order to quench the reaction, water was slowly added keeping the temperature between about 0° and 5° C. The ether layer was then separated, dried over anhydrous sodium sulfate, filtered and concentrated under reduced pressure to obtain 16.5 g. of product in the form of an oil. This product was chromatographed on acid washed alumina using a mixture of petroleum ether and ethyl ether to develop and elute the column. At 50:50 petroleum ether-ethyl ether concentration 3 g. of the enol acetate was separated which conformed to the desired enol acetate, 16α - methyl - 3α,20 - diacetoxy - 17(20) - pregnen - 11-one; perbenzoic acid titration showed one double bond.

The structure of the enol acetate prepared as described above was confirmed by conversion of the product to 16α-methyl-3α,17α-dihydroxy-pregnan-11,20-dione as follows:

Two grams of the enol-acetate was dissolved in 16 cc. of perbenzoic acid solution in benzene (0.45 M.) and left to stand over 18 hours. The next day the solution was worked up by washing with aqueous KOH (0.25 N) solution to remove excess acid and finally with water to remove any base. The organic layer was dried over anhydrous sodium sulfate, filtered and concentrated in vacuo. In order to hydrolyze the epoxide it was dissolved in 50 ml. of methanol and 30 cc. of aqueous 0.75 N NaOH. The solution was stirred at room temperature for 1 hour and then diluted with water and extracted with methylene chloride. The organic extracts were dried over anhydrous MgSO$_4$, filtered and concentrated to an oil. This oil was dissolved in a minimum amount of ether, seeded and allowed to stand at room temperature. Crystals of 16α-methyl-3α,17α-dihydroxy pregnane-11,20-dione separated which melted at 178–186° C. A mixed M.P. with authentic material of M.P. 189–192° C. melted at 178–188° C. The infrared spectrum was identical with that of the known product.

The solution of the metallic enolate used as the starting material in the foregoing example was prepared as follows:

In a 1 liter flask equipped with stirrer, reflux condenser and addition funnel was added 9.7 g. of magnesium turnings and 120 cc. of ether. To this was added 60 gm. of methyl iodide slowly. Reaction took place readily. After all the methyl iodide was added, the reaction was refluxed for 40 minutes or until all the magnesium had dissolved. To this solution was added 0.18 gm. of cuprous chloride and the mixture stirred for 10 minutes. A solution of 18.6 gm. of 3-acetoxy-16-pregnen-11,20-dione in 600 cc. of ether was slowly added to the Grignard solution with stirring in 30 minutes. The mixture was refluxed for an additional two hours and then treated with acetyl chloride as described above.

EXAMPLE 2

*Preparation of 16α - methyl - 3α,20 - diacetoxy-17(20)-pregnen-11-one by acetylation of the metallic enolate obtained by reacting 3α-acetoxy-16-pregnen-11,20-dione with dimethyl cadmium.*

To the ether solution of the metallic enolate prepared by reacting 3α-acetoxy-16-pregnen-11,20-dione with dimethyl cadmium as described below, was added 75.0 ml. of acetic anhydride dropwise at room temperature. The mixture was heated at reflux for one hour and cooled to 10° C. A solution of 32.0 ml. of concentrated hydrochloric acid in 140 ml. of water was added at 10–20° C. and the mixture allowed to stir for 10 minutes. The mixture was filtered through diatomaceous earth and extracted with saturated aqueous sodium bicarbonate until neutral. The ether layer was dried over anhydrous sodium sulfate and concentrated to dryness in vacuo to yield 16α-methyl-3α,20-diacetoxy-17(20)-pregnen-11-one as a gum having $[\alpha]D(1\% \text{ CHCl}_3)+56.4°$.

The structure of the enol acetate prepared as described above was confirmed by conversion of the product to 16α - methyl-3α,-17α-dihydroxy-pregnan-11,20-dione as follows:

The enol acetate dissolved in 62.0 ml. of dry benzene, and 160.0 ml. of a benzene solution of 6.7 g. of perbenzoic acid was stirred for 20 hours at room temperature. At the end of this time 96% of the calculated amount of perbenzoic acid had reacted. The system was cool to 10° C. and the excess prebenzoic acid decomposed by addition of 5% aqueous sodium bisulfite. The layers were separated and the benzene solution was extracted with saturated aqueous sodium bicarbonate until neutral. The benzene layer was dried over anhydrous sodium sulfate and concentrated to dryness in vacuo. The resulting residue was dissolved in 125 ml. of methanol and 27.3 ml. of 25% aqueous sodium hydroxide was added dropwise at 25° C. The mixture was aged for two hours at room temperature. The mixture was then cooled to 10° C. and 250 ml. of water was added dropwise. The precipitated product was collected by filtration, washed with water until neutral and dried. Recrystallization from ethyl acetate afforded 16α-methyl-3α,17α-dihydroxy pregnan-11,20-dione, M.P. 191–192° C.

The solution of the metallic enolate used as the starting material in the foregoing example was prepared as follows:

To a slurry of 40.4 g. of anhydrous cadmium chloride and 2.5 g. of cuprous chloride in 200 ml. of anhydrous ethyl ether was added 132 ml. of methyl magnesium bromide (3.0 molar in ethyl ether) at 25° C. under an atmosphere of dry nitrogen. The mixture was heated at reflux for 2.0 hours and then cooled to room temperature. At this point a Gilman test indicated the absence of Grignard reagent. A slurry of 18.6 g. of 3α-acetoxy-16-pregnene-11,20-dione in 250 ml. of anhydrous ethyl ether was added to the dimethyl cadmium slurry and the mixture heated at reflux for 5 hours.

EXAMPLE 3

*Preparation of 16α-methyl-3α,20-diacetoxy-17(20)-pregnen-11-one by the acetylation of the reaction product of 3α-acetoxy-16-pregnene-11,20-dione with dimethyl zinc*

To a solution containing the metallic enolate obtained by intimately contacting 3α-acetoxy-16-pregnene-11,20-dione with dimethyl zinc in ethyl ether, as described below, is added about 20 ml. of acetic anhydride at room temperature. The resulting reaction mixture is heated under reflux for about two hours. To the resulting cooled reaction mixture is added a solution of 8 ml. of hydrochloric acid in 35 ml. of water and the mixture allowed to stir for 15 minutes. The mixture is then filtered through diatomaceous earth and extracted with saturated aqueous sodium bicarbonate until neutral. The ether layer is dried over anhydrous sodium sulfate and concentrated under reduced pressure to produce 16α-methyl-3α,20-diacetoxy-17(20)-pregnen-11-one.

The solution of the metallic enolate used as the starting material in the foregoing example is prepared as follows:

7 g. of fused (and pulverized) $ZnCl_2$ and 0.5 g. cuprous chloride was mixed with 50 ml. dry ether, and 34 ml. of (3 molar) ethereal methylmagnesium bromide solution was added with stirring and the mixture refluxed under nitrogen for one hour (Gilman test faintly positive). To the reddish brown suspension was added a solution of 4.65 g. of 3α-acetoxy-16-pregnene-11,20-dione in 200 ml. dry ether at 30–34° C. over 3 minutes. The mixture was stirred at 26–27° C. for 66 hours.

EXAMPLE 4

*Preparation of 16α-methyl-9(11)17(20)-pregnadiene-3α,*

20-diol diacetate by the acetylation of the reaction product of 3α-acetoxy-9(11),16-pregnadien-20-one with dimethyl cadmium To a solution containing the metallic enolate obtained by intimately contacting 3α-acetoxy-9(11),16-pregnadiene-20-one with dimethyl cadmium in ethyl ether as described below is added about 5 ml. of acetic anhydride. The resulting reaction mixture is heated under reflux for about two hours. To the cooled reaction mixture is added a solution of 2 ml. of hydrochloric acid in 8 ml. of water and the mixture allowed to stir for 15 minutes. The mixture is then filtered thru diatomaceous earth and extracted with saturated aqueous sodium bicarbonate until neutral. After drying the ether layer over sodium sulfate, it is evaporated under reduced pressure to yield 16α-methyl-9(11),17(20)-pregnadiene-3α,20-diol diacetate.

The solution of the metallic enolate used as the starting material in the foregoing example is prepared as follows:

To a suspension of 2.17 gms. of cadmium chloride and 0.11 gm. of cuprous chloride in 11 ml. of ether was added 7.3 ml. of 3 molar methylmagnesium iodide in ether. The mixture was boiled under reflux under nitrogen for one and one-half hours. To the mixture was added a solution of 1 gm. of 3-acetoxy-9(11),16-pregnadien-20-one in 43 ml. of ether and the mixture refluxed with stirring for 16 hours.

The 3α-acetoxy-9(11),16-pregnadien - 20 - one used as the starting material in this example can be prepared starting with the known compound, 3α-acetoxy-11β-hydroxypregnan-20-one, as follows: The starting compound is reacted wtih bromine in chloroform at 0–5° C. to form the corresponding 17,21-dibromo compound. Upon treating the chloroform solution containing the 17,21-dibromo compound with gaseous hydrogen bromide at a temperature of about 40–45° C., 3α-acetoxy-17,21-dibromo-9(11)-pregnen - 20 - one is obtained. Reaction of this product in acetone with sodium iodide affords 3α-acetoxy-17-bromo-21-iodo-9(11) pregnen-20 - one which upon treatment with sodium bisufite is converted to 3α-acetoxy-17-bromo-9(11)-pregnen-20-one. Heating this compound with pyridine under reflux for about 6 hours produces 3α-acetoxy-9(11),16-pregnadien-20-one. These reactions are described in detail in the copending application of Frank A. Cutler, Jr., and John M. Chemerda, Serial No. 748,178, filed July 14, 1958.

EXAMPLE 5

Preparation of 16α-n-propyl-3,20-diacetoxy-17(20)-pregnen-11-one by the acetylation of the reaction product of 3α-acetoxy-16-pregnene-11,20-dione with di-n-propyl cadmium To a solution containing the metallic enolate obtained by intimately contacting 3α-acetoxy-16-pregnene-11,20-dione with di-n-propyl cadmium in ethyl ether, as described below, is added about 20 ml. of acetic anhydride at room temperature, and the resulting reaction mixture heated for about two hours under reflux. The resulting reaction mixture is treated with hydrochloric acid, and the reaction product recovered by the procedures described in Example 3 to produce 16α-n-propyl-3,20-diactoxy-17(20)-pregnen-11-one.

The starting material is prepared as follows:

n-Propylmagnesium bromide is prepared from 12.3 g. of n-propyl bromide and 2.4 g. of magnesium in 40 ml. of ether. The Grignard reagent is added to a suspension of 10.12 gms. of cadmium chloride and 0.5 gm. of cuprous chloride in 50 ml. of ether and the mixture is refluxed under nitrogen for one and one-half hours. To the mixture is added a solution of 4.65 gms. of 3α-acetoxy-16-pregnen-11,20-dione in 200 ml. of ether and the mixture stirred 48 hours at 32° C.

The 16α-lower alkyl compounds prepared in accordance with the methods of this invention are useful intermediates in the preparation of compounds such as 16α-methyl - 9α - fluoro prednisolone. 16α - methylprednisone, 16α-methyl prednisolone, and the like. These compounds have cortisone-like activity and are useful anti-inflammatory agents especially effective in the treatment of arthritis and related diseases. Thus, as shown in Examples 1 and 2 the metal enolate is converted to 16α-methyl-3α,17α-dihydroxy pregnan-11,20-dione which can be converted to 16α-methyl-9α-fluoro prednisolone, 16α-methyl prednisone and 16α-methyl prednisolone by methods known in the art.

The 16α - methyl - 9(11),17(20) - pregnadiene - 3α, 20-diol diacetate prepared as shown in Example 4 is similarly useful as an intermediate in the synthesis of 16α-methyl-prednisolone and other related compounds. Thus, by the same procedures described in Examples 1 and 2 this compound is converted to 16α-methyl-3α,17α-dihydroxy-9(11)-pregnen-20-one. Upon reacting this compound with hypobromous acid 16α-methyl-3α-acetoxy - 9α - bromo - 11,17α - dihydroxy - pregnan - 20-one is obtained which upon reaction with potassium acetate in ethanol affords the corresponding 9,11-oxido compound. Treatment of this compound with hydrogen fluoride affords 16α-methyl-3α-acetoxy-9α-fluoro-11β,17α-dihydroxy pregnane-20-one. This compound is then treated microbiologically to introduce a hydroxy substituent at position 21 to obtain 16α-methyl-3α,11β,17α,21-tetrahydroxy-9α-fluoro pregnan-20-one. This compound is then subjected to a further microbiological treatment by contacting them with a growing culture of *Nocardia blackwellii* to oxidize the 3-hydroxy to a 3-keto group and introduce double bonds into the A ring at positions 1,2 and 4,5 thereby producing 16α-methyl-9α-fluoro prednisolone.

Various changes and modifications may be made in carrying out the present invention without departing from the spirit and scope thereof. Insofar as these changes and modifications are within the purview of the annexed claims, they are to be considered as part of our invention.

What is claimed is:

1. The process which comprises intimately contacting the 16 alpha lower alkyl-20-keto steroid metallic enolate obtained by reacting a $\Delta^{16}$-20-keto steroid of the group consisting of pregnane and allopregnane series with a member from the group consisting of a lower alkyl magnesium halide, a di-lower alkyl cadmium and a di-lower alkyl zinc with an acylating agent from the group consisting of lower alkanoyl halides and lower alkanoyl anhydrides to produce the corresponding 16α-lower alkyl-20-keto steroid enol acylate.

2. The process of claim 1 wherein the acylating agent is acetyl chloride.

3. The process of claim 1 wherein the acylating agent is acetic anhydride.

4. The process of claim 1 wherein the acylating agent is a lower alkanoyl acylating agent.

5. The process of claim 1 wherein the 16α-lower alkyl 20-keto metallic enolate is the conjugate addition product obtained by reacting the $\Delta^{16}$-20-keto steroid with a lower alkyl magnesium halide.

6. The process of claim 1 wherein the 16α-lower alkyl-20-keto metallic enolate is the conjugate addition product obtained by reacting the $\Delta^{16}$-20-keto steroid with a di-lower alkyl cadmium.

7. The process of claim 1 wherein the 16α-lower alkyl-20-keto metallic enolate is the conjugate addition product prepared by reacting the $\Delta^{16}$-20-keto steroid with a di-lower alkyl zinc.

8. The process which comprises intimately contacting the product obtained by the reaction of a lower alkyl magnesium halide with 3α-acetoxy-16-pregnene-11,20-dione, with an acetylating agent to produce 16α-lower alkyl-3α,20-diacetoxy-17(20)-pregnen-11-one.

9. The process of claim 8 wherein the lower alkyl magnesium halide is methyl magnesium bromide.

10. The process which comprises intimately contacting the product obtained by the reaction of a di-lower alkyl metal compound wherein the metal is from the group consisting of zinc and cadmium with 3α-acetoxy-16-pregnene-11,20-dione, with an acetylating agent to produce 16α-lower alkyl-3α,20-diacetoxy-17(20)-pregnen-11-one.

11. The process of claim 10 wherein the di-lower alkyl metal is dimethyl cadmium.

12. The process of claim 10 wherein the di-lower alkyl metal is dimethyl zinc.

13. The process which comprises intimately contacting the product obtained by the reaction of a di-lower alkyl metal compound wherein the metal is from the group consisting of zinc and cadmium with 3α-acetoxy-9(11),16-pregnadien-20-one, with an acetylating agent to produce 16α-lower alkyl-3α,20-di-acetoxy 9(11),17(20)-pregnadiene.

14. The process of claim 13 wherein the di-lower alkyl metal is dimethyl cadmium.

15. The process of claim 13 wherein the di-lower alkyl metal is dimethyl zinc.

No references cited.